(12) United States Patent
Spalka et al.

(10) Patent No.: US 8,024,581 B2
(45) Date of Patent: Sep. 20, 2011

(54) COMPUTER READABLE STORAGE MEDIUM FOR GENERATING A PSEUDONYM, COMPUTER IMPLEMENTED METHOD AND COMPUTING DEVICE

(75) Inventors: Adrian Spalka, Koblenz (DE); Jan Lehnhardt, Koblenz (DE)

(73) Assignee: CompuGROUP Medical AG, Koblenz (DE)

( * ) Notice: Subject to any disclaimer, the term of this patent is extended or adjusted under 35 U.S.C. 154(b) by 0 days.

(21) Appl. No.: 12/732,536

(22) Filed: Mar. 26, 2010

(65) Prior Publication Data

US 2011/0154055 A1    Jun. 23, 2011

Related U.S. Application Data

(63) Continuation-in-part of application No. 12/690,278, filed on Jan. 20, 2010.

(30) Foreign Application Priority Data

Dec. 18, 2009   (EP) ..................................... 09179974
Mar. 11, 2010   (EP) ..................................... 10156171

(51) Int. Cl.
*H04L 9/00*   (2006.01)
*G06F 7/04*   (2006.01)
(52) U.S. Cl. .......... 713/189; 713/187; 713/188; 726/27; 726/28; 726/29; 726/30
(58) Field of Classification Search .................. 713/189
See application file for complete search history.

(56) References Cited

U.S. PATENT DOCUMENTS

2005/0157880 A1* 7/2005 Kurn et al. ..................... 380/279
2008/0154782 A1* 6/2008 Kang et al. ..................... 705/74

* cited by examiner

*Primary Examiner* — Longbit Chai
(74) *Attorney, Agent, or Firm* — Hulsey, P.C.; William N. Hulsey, III; Loren T. Smith

(57) ABSTRACT

The invention relates to a method of generating a pseudonym, the method including accessing an input value and calculating a pseudonym by applying a cryptographic one-way function to the input value, where the cryptographic one-way function is an injective function. In alternative embodiments, the cryptographic one-way function is an embedding and/or randomizing function.

16 Claims, 7 Drawing Sheets

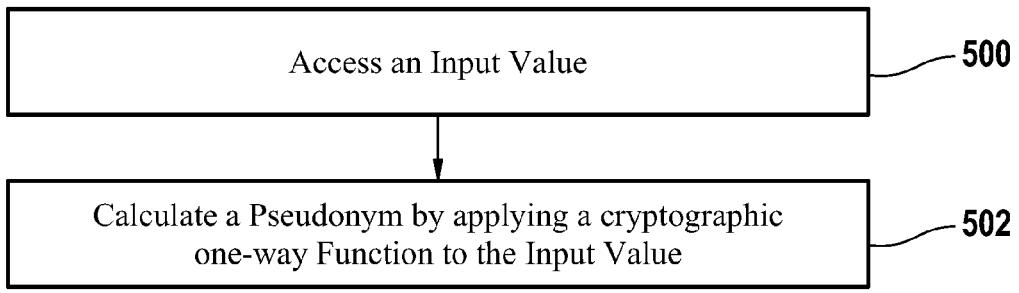
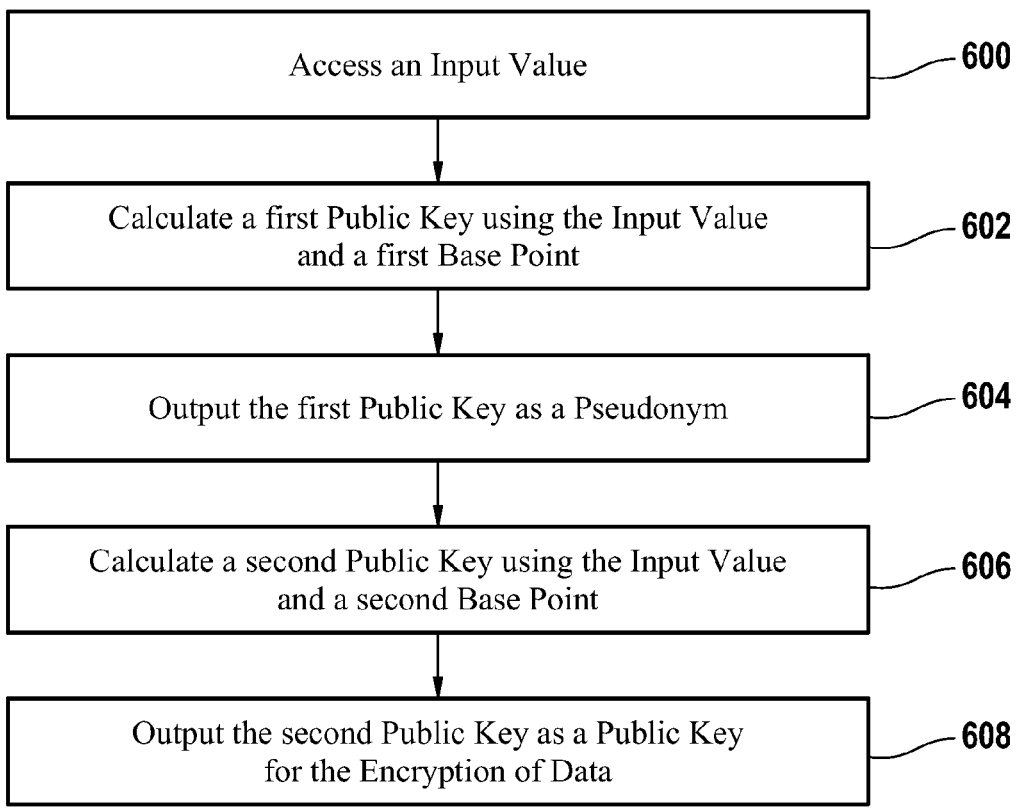

COMPUTER READABLE STORAGE MEDIUM FOR GENERATING A PSEUDONYM, COMPUTER IMPLEMENTED METHOD AND COMPUTING DEVICE

CROSS REFERENCE TO RELATED APPLICATIONS

This application is a continuation-in-part of U.S. patent application Ser. No. 12/690,278, entitled "COMPUTER IMPLEMENTED METHOD FOR GENERATING A PSEUDONYM, COMPUTER READABLE STORAGE MEDIUM AND COMPUTER SYSTEM", filed on Jan. 20, 2010. This application claims the priority of European Patent Application #EP10156171, entitled "A COMPUTER READABLE STORAGE MEDIUM FOR GENERATING A PSEUDONYM, COMPUTER IMPLEMENTED METHOD AND COMPUTING DEVICE", filed on Mar. 11, 2010. This application also claims the priority of European Patent Application #EP09179974, entitled "A COMPUTER IMPLEMENTED METHOD FOR GENERATING A PSEUDONYM, COMPUTER READABLE STORAGE MEDIUM AND COMPUTER SYSTEM", filed on Dec. 18, 2009.

FIELD OF THE INVENTION

The present invention relates to the field of computer implemented pseudonym generators.

BACKGROUND AND RELATED ART

Various computer implemented schemes for providing a pseudonym for a user are as such known. A pseudonym is typically used for protecting the informational privacy of a user such as in a social network. Such computer implemented schemes for providing a pseudonym typically enable the disclosure of identities of anonymous users if an authority requests it, if certain conditions are fulfilled. For example, Benjumea et al, Internet Research, Volume 16, No. 2, 2006 pages 120-139 devise a cryptographic protocol for anonymously accessing services offered on the web whereby such anonymous accesses can be disclosed or traced under certain conditions.

SUMMARY

The invention provides for a computer readable storage medium, a computer implemented method, and a computing device in the accompanying claims.

The term 'user-selected secret' is understood herein as any secret data that is selected by or related to a user, such as a user-selected secret password or a secret key, such as a symmetric cryptographic key. Further, the term 'user-selected secret' does also encompass a combination of biometric data obtained from the user and a user-selected password or secret key, such as a biometric hash value of the password or secret key.

The term 'memory' as used herein encompasses any volatile or non-volatile electronic memory component or a plurality of electronic memory components, such as a random access memory.

The term 'embedding function' or 'embedding component' as used herein encompasses any injective function that maps the elements of an n-dimensional space onto elements of an m-dimensional space, where n>m. For the purpose of this invention, we focus on embedding functions where m=1. In accordance with embodiments of this invention n is equal to 2 and m is equal to 1 for combining two elements onto a single element. In one embodiment, a user-selected secret and a public parameter are mapped by the embedding function to the 1-dimensional space to provide a combination of the user selected secret and the public parameter, e.g. a single number that embeds the user selected secret and the public parameter. This single number constitutes the embedded secret. In another embodiment, a first hash value of the user selected secret and a random number are mapped by the embedding function to the 1-dimensional space to provide the embedded secret.

A 'randomizing function' or 'randomizing component' as understood herein encompasses any injective function that provides an output of data values that are located within a predefined interval and wherein the distribution of the data values within the predefined interval is a substantially uniform distribution.

The term 'embedding and randomizing function' as used herein encompasses any function that implements both an embedding function and a randomizing function.

The term 'computer readable storage medium' as used herein encompasses any tangible storage medium which may store instructions which are executable by a processor of a computing device. In some embodiments, a computer readable storage medium may also be able to store data which is able to be accessed by the processor of the computing device. An example of a computer readable storage medium include, but are not limited to: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example data may be retrieved over a modem, over the Internet, or over a local area network.

The term 'computer memory' or 'memory' as used herein encompasses a computer readable storage medium which is directly accessible to a processor. Examples of computer memory include, but are not limited to: RAM memory, registers, and register files of a processor.

The term 'computer storage' as used herein encompasses any non-volatile computer readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

The term 'computing device' as used herein encompasses any device comprising a processor. The term 'processor' as used herein encompasses any electronic component which is able to execute a program or machine executable instruction. References to the computing device comprising "a processor" should be interpreted as possibly containing more than one processor. The term computing device should also be interpreted to possibly refer to a collection or network of computing devices each comprising a processor. Many programs have their instructions performed by multiple processors that may be within the same computing device or which may even distributed across multiple computing device. The term 'computer system' may be interpreted herein as being a 'computing device.'

Embodiments of the present invention are particularly advantageous as an extremely high degree of protection of the informational privacy of users is provided. This is due to the fact that an assignment of the user's identity to the user's pseudonym does not need to be stored and that no third party is required for establishing a binding between the pseudonym and the user's identity. In contrast, embodiments of the present invention enable the generation of a user's pseudonym in response to the user's entry of a user-selected secret whereby the pseudonym is derived from the user-selected secret. As the user-selected secret is only known by the user and not stored on any computer system there is no way that a third party could break the informational privacy of the user, even if the computer system would be confiscated such as by a government authority.

This enables storage of sensitive user data, such as medical data, in an unencrypted form in a publicly accessible database. The user's pseudonym can be used as a database access key, e.g. a primary key or candidate key value that uniquely identifies tuples in a database relation, for read and write access to data objects stored in the database.

For example, the database with pseudonymous data can be used for a decision support system, e.g. in the medical field for evaluating a user's individual medical data and processing the data by rules. The result of the evaluation and processing by rules may be hints and recommendations to the physician regarding the user's health condition and further treatment.

The invention provides for a computer readable storage medium having stored therein instructions. When the instructions are executed by a computing device the instructions cause the computing device to perform a method of generating a pseudonym. The method comprises the step of accessing an input value. The method further comprises a step of calculating a pseudonym by applying a cryptographic one-way function to the input value. The cryptographic one-way function is an injective function.

In another embodiment the input value is a private key which can be used for calculating at least one public key to form at least one asymmetric cryptographic key pair. This embodiment is advantageous because the private key can be used for generating a pseudonym and because the pseudonym is a public key it is not computationally feasible to calculate what the private key is from the pseudonym. This provides a high degree of security for the private key.

In another embodiment the at least one asymmetric cryptographic key pair is calculated using elliptic curve cryptography. This embodiment is advantageous because different public keys can be calculated by using different base points. This allows the generation of more than one public key for a particular private key or input value.

In another embodiment the method further comprises the step of calculating a first public key using the input value and a first base point. The method further comprises the step of outputting the first public key as a pseudonym. This embodiment is advantageous because a private key has been used to generate a pseudonym calculated from a public key using elliptic curve cryptography. A pseudonym has been generated for which the input value or private key cannot be inferred.

In another embodiment the method further comprises the step of calculating a second public key using the input value and a second base point. The second base point is different from the first base point. The method further comprises the step of outputting the second public key as a public key for the encryption of data. This embodiment is advantageous because a single input value or private key has been used to generate both a pseudonym and a public key for the encryption of data. This is particularly advantageous because only a single input value is needed for both.

In another embodiment the cryptographic one-way function comprises an embedding and/or randomizing function. This is advantageous because the input value may be clear text or an easily guessed value. By using an embedding and/or randomizing function a pseudonym which is more difficult to decrypt may be constructed.

In accordance with an embodiment of the invention, at least one public parameter is used for applying the embedding and randomization function. A public parameter may be the name of the user, an email address of the user or another identifier of the user that is publicly known or accessible. A combination of the user-selected secret and the public parameter is generated by the embedding component of the embedding and randomization function that is applied on the user-selected secret and the public parameter.

The combination can be generated such as by concatenating the user-selected secret and the public parameter or by performing a bitwise XOR operation on the user-selected secret and the public parameter. This is particularly advantageous as two users may by chance select the same secret and still obtain different pseudonyms as the combinations of the user-selected secrets with the user-specific public parameters differ.

In accordance with an embodiment of the invention, the embedding component of the embedding and randomizing function comprises a binary cantor pairing function. The user-selected secret and the public parameter are embedded by applying the binary cantor pairing function on them.

In accordance with an embodiment of the invention, the randomizing component of the embedding and randomizing function uses a symmetric cryptographic algorithm like the Advanced Encryption Standard (AES) or the Data Encryption Standard (DES) by means of a symmetric key. This can be performed by encrypting the output of the embedding component of the embedding and randomizing function, e.g. the binary cantor pairing function, using AES or DES.

In accordance with an embodiment of the invention, the symmetric key that is used for randomization by means of a symmetric cryptographic algorithm is user-specific. If the symmetric key is user-specific, the use of a public parameter can be skipped, as well as embedding the user-selected secret and the public parameter; the randomizing function can be applied then solely on the user-selected secret. By applying a symmetric cryptographic algorithm onto the user-selected secret using a user-specific symmetric key both embedding and randomization of the user-selected secret are accomplished. If the symmetric key is not user-specific, the use of the public parameter and embedding the user-selected secret and the public parameter are necessary.

In accordance with an embodiment of the invention, the embedding and randomizing function is implemented by performing the steps of applying a first one-way function on the user-selected secret to provide a first value, providing a random number, embedding the random number and the first value to provide a combination, and applying a second one-way function on the combination to provide a second value, wherein the second value constitutes the private key. This embodiment is particularly advantageous as it provides a computationally efficient method of implementing an embedding and randomization function.

In accordance with an embodiment of the invention, the computation of the public key is performed by elliptic curve cryptography (ECC). The private key that is output by the embedding and randomizing function is multiplied with a first base point given by the domain parameters of the elliptic curve to provide another point on the elliptic curve, which is the pseudonym.

In accordance with an embodiment of the invention, it is determined whether the output of the embedding and randomizing function fulfils a given criterion. For example, it is checked whether the output of the embedding and randomization function is within the interval between 2 and n−1, where n is the order of the elliptic curve. If the output of the embedding and randomizing function does not fulfil this criterion another random number is generated and the embedding and randomization function is applied again to provide another output which is again checked against this criterion. This process is performed repeatedly until the embedding and randomizing function provides an output that fulfils the criterion. This output is then regarded as the private key that is used to calculate the public key, i.e. the pseudonym, by multiplying the private key with the first base point.

In accordance with a further embodiment of the invention the base point is varied leaving the other domain parameters unchanged for computation of multiple pseudonyms for a given user. This provides a computationally efficient way to compute multiple pseudonyms for a given user in a secure way.

In another aspect the present invention relates to a computer readable storage medium having stored therein instructions, which when executed by a computer system, cause the computer system to generate a pseudonym for a user upon a user's entry of a user-selected secret by performing the steps of storing the user-selected secret in memory, computing a private key by applying an embedding and randomizing function onto the secret and possibly additional public parameters, storing the private key in memory, computing a public key using the private key, the public key and the private key forming an asymmetric cryptographic key pair, erasing the secret and the private key from memory, outputting the public key for providing the pseudonym.

In another aspect the present invention relates to a computer system comprising means for entering a user-selected secret, memory means for storing the user-selected secret and a private key, processor means being operable to compute the private key by applying an embedding and randomizing function onto the secret and possibly additional public parameters, compute a public key using the private key, the public key and the private key forming an asymmetric cryptographic key pair, erase the secret and the private key as well as any intermediate computational results from memory, and output the public key for providing the pseudonym.

In another aspect, the invention provides for a computer implemented method of generating a pseudonym. The method comprises the step of accessing an input value. The method further comprises the step of calculating a pseudonym by applying a cryptographic one-way function to the input value. The cryptographic one-way function is an injective function. This embodiment is advantageous because the input value is used to calculate a pseudonym using a cryptographic one-way function. The pseudonym can be used by a user as a pseudonym for many different situations for instance for an online forum or in order to keep medical records private. The advantage of using an input value to generate a pseudonym using a cryptographic one-way function is that it is not necessary to store a table with users and their pseudonyms. This increases the security of the pseudonym because the input value can be kept private and not shared or stored within a system. Because the pseudonym is calculated using a cryptographic one-way function the input value will be impossible to calculate from the pseudonym.

In another aspect the invention provides for a computing device comprising a processor and a memory. The memory contains instructions for performing a method of generating a pseudonym. The method comprises the step of accessing an input value. The method further comprises the step of calculating a pseudonym by applying a cryptographic one-way function to the input value. A cryptographic one-way function is an injective function. The advantages of this embodiment have been previously discussed.

In another embodiment the computing device is any one of a cellular telephone, a smart card, a security token, a personal digital system, an RFID tag, an RFID card, a computer, and a computer system. In the case of security token the computing device may also comprise components or a computer external to the security token. For instance if the security token simply has storage for the input value, then the computing device may be a computer or other computing device which accesses the memory of the security token. The computing device may be a computer system.

In another embodiment the input value is a private key which can be used for calculating at least one public key to form at least one asymmetric cryptographic key pair. The advantages of this embodiment have been previously discussed.

In another embodiment the computing device comprises memory wherein the input value is stored. In this embodiment the input value is stored within the memory and is accessible by reading the memory from the computing device. In this case the input value may be secured by securing the computing device. For instance in the case of a smart card or an RFID card the input value may be stored in secure memory which may not be accessed without proper access instructions and which is physically protected from tampering.

In another embodiment a user-selected secret is received from a user interface. The input value is derived from the user-selected secret. In this embodiment security for the input value is provided by not storing it in the computing device. The input value is generated from a user-selected secret.

In another embodiment the computing device comprises a user interface for entering a user-selected secret. The computing device further comprises a memory for storing the user-selected secret and a private key. The computing device further comprises a processor operable for executing instructions stored in the memory. The memory contains instructions for performing the step of receiving a user-selected secret. The memory further comprises instructions for performing the step of storing the user-selected secret in memory. The memory further contains instructions for performing the step of computing a private key by applying an embedding and randomizing function onto the secret and possibly additional public parameters. The memory further contains instructions for performing the step of storing the private key in the memory. The private key is the input value. The memory further contains instructions for performing the step of computing a public key using the private key using a cryptographic one-way function. The public key and the private key form an asymmetric cryptographic key pair. The memory further contains instructions for performing the step of outputting the public key for providing the pseudonym. The memory further contains instructions for performing the step of erasing the secret and the private key from the memory.

BRIEF DESCRIPTION OF THE DRAWINGS

In the following embodiments of the invention are explained in greater detail, by way of example only, making reference to the drawings in which:

FIG. 5 is a flowchart being illustrative of a further embodiment of a method of the invention.

FIG. 6 is a flowchart being illustrative of a further embodiment of a method of the invention.

DETAILED DESCRIPTION

Like numbered elements in these figures are either equivalent elements or perform the same function. Elements which have been discussed previously will not necessarily be discussed in later figures if the function is equivalent.

Figure 1:
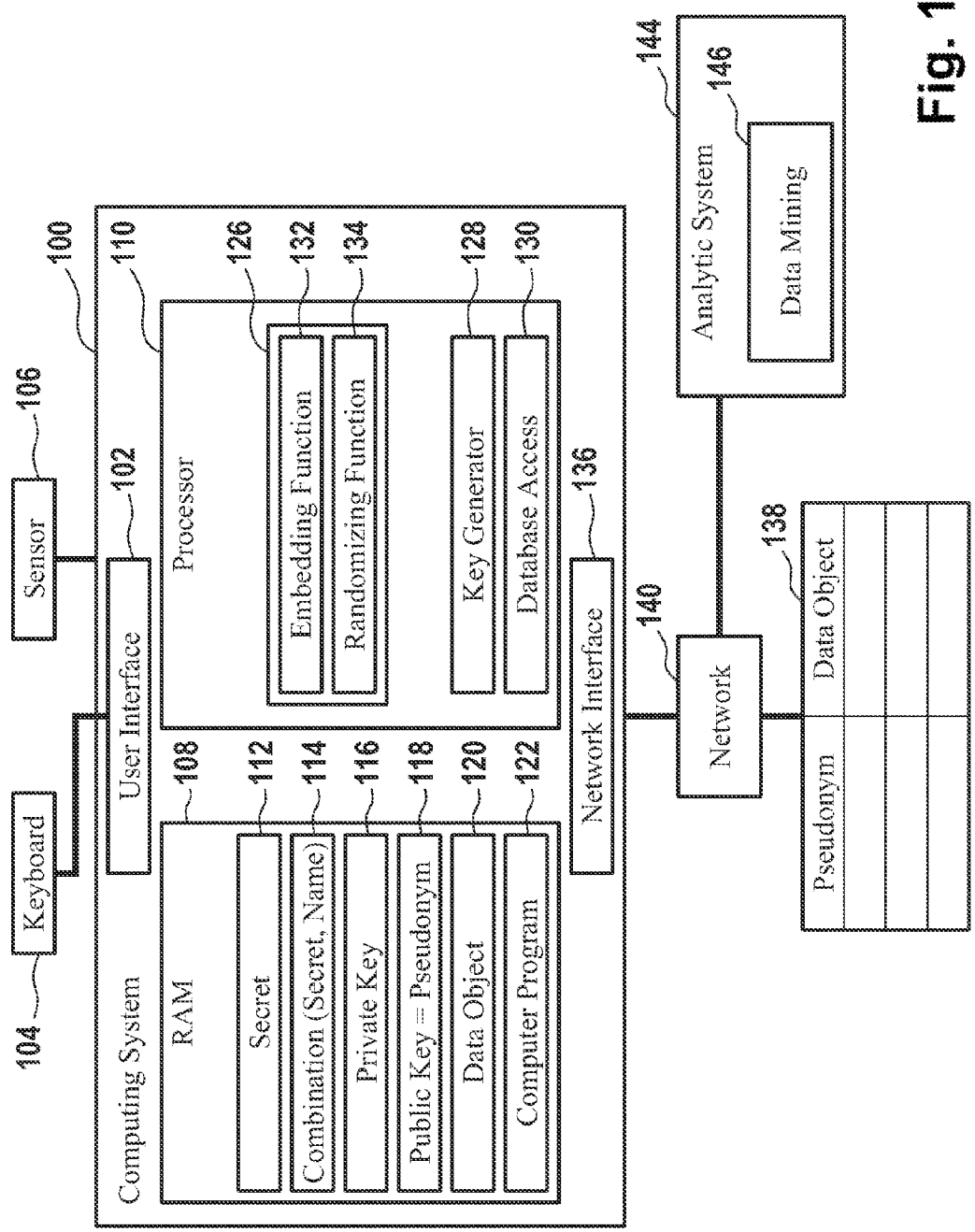
FIG. 1 is a block diagram of a first embodiment of a computer system of the invention.

FIG. 1 shows a computer system 100 that has a user interface 102 for a user's entry of a user-selected secret that is designated as $s_T$ in the following. For example, a keyboard 104 may be coupled to the computer system 100 for entry of $s_T$. Instead of a keyboard 104 a touch panel or another input device can be coupled to the computer system 100 for entry of $s_T$. In addition, a sensor 106 can be coupled to the computer system 100 such as for capturing biometric data from a biometric feature of the user. For example, the sensor 106 may be implemented as a fingerprint sensor in order to provide biometric fingerprint data to the computer system 100.

A public parameter, such as the user's name or email address, can also be entered into the computer system 100 via the keyboard 104 or otherwise. For example, a personal set $V_{T,i}$ containing at least one user-specific public parameter, such as the user's name or email address, is entered into the computer system 100 by the user $T_i$.

The computer system 100 has a memory 108, such as a random access memory, and at least one processor 110. The memory 108 serves for temporary storage of the user-selected secret $s_T$ 112, a combination 114 of $s_T$ 112 and $V_{T,i}$, a private key 116, a public key 118 that constitutes a pseudonym of the user $T_i$, and a data object 120, such as a medical data object containing medical data related to the user $T_i$. Further, the memory 108 serves for loading computer program instructions 122 for execution by the processor 110.

The computer program instructions 122 provide an embedding and randomizing function 126, a key generator 128 and may also provide a database access function 130 when executed by the processor 110.

The embedding and randomizing function 126 may be provided as a single program module or it may be implemented by a separate embedding function 132 and a separate randomizing function 134. For example, the embedding function 132 or an embedding component of the embedding and randomization function 126 provides the combination 114 by concatenating $s_T$ and the user's name or by performing a bitwise XOR operation on $s_T$ and the user's name.

In one implementation, the embedding and randomizing function 126 implements symmetric encryption provided by a symmetric cryptographic algorithm, e.g. AES, using a user-specific symmetric key for encryption of the user-selected secret 112. This provides both embedding and randomizing of $s_T$ 112.

In another implementation, the embedding function 132 is implemented by a binary cantor pairing function for embedding $s_T$ 112 and $V_{T,i}$, and the randomizing function 134 is implemented by AES encryption using a symmetric key that is the same for the entire set of users T.

Figure 3:
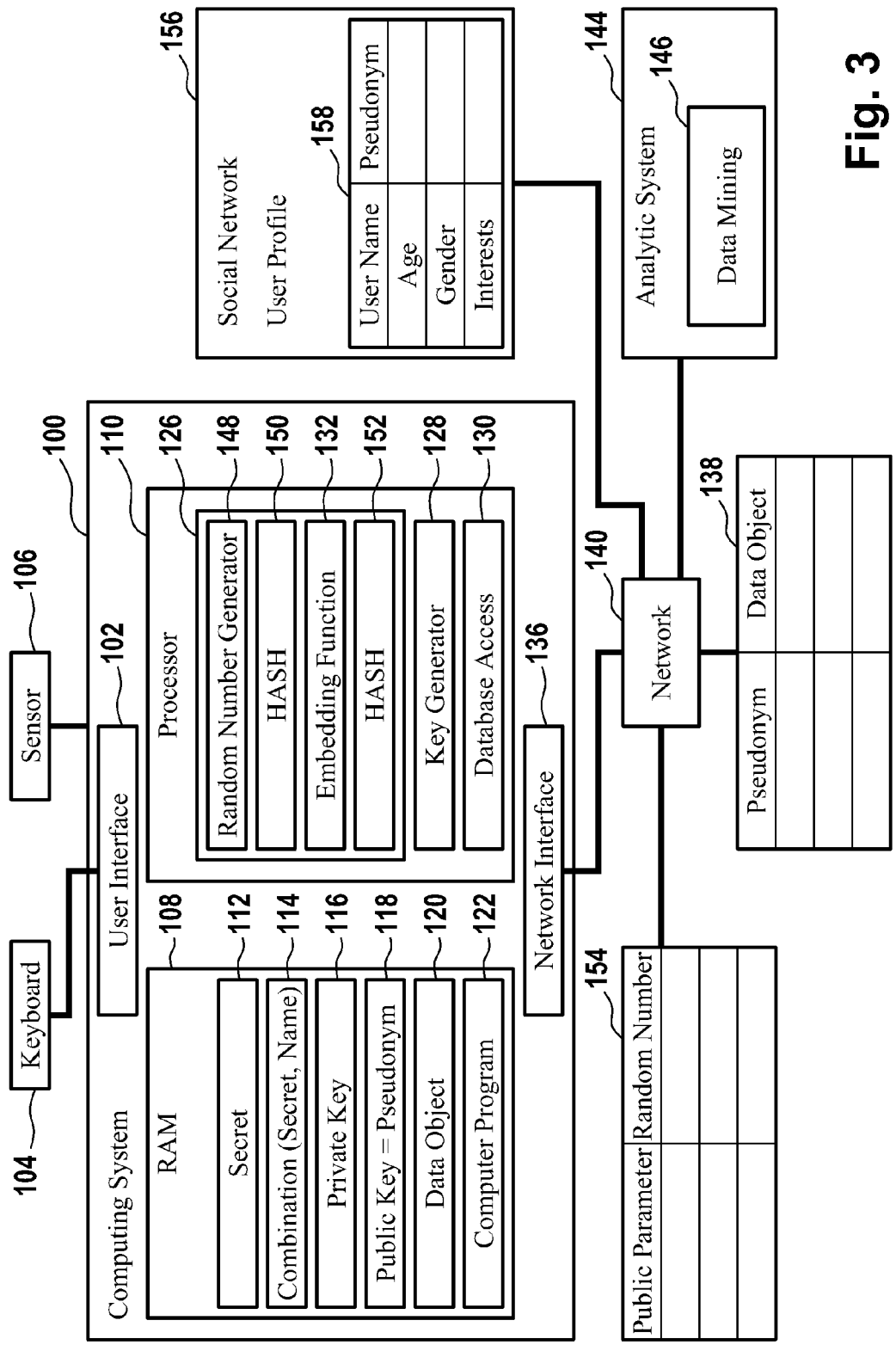
FIG. 3 is a block diagram of a further embodiment of a computer system of the invention.
Figure 4:
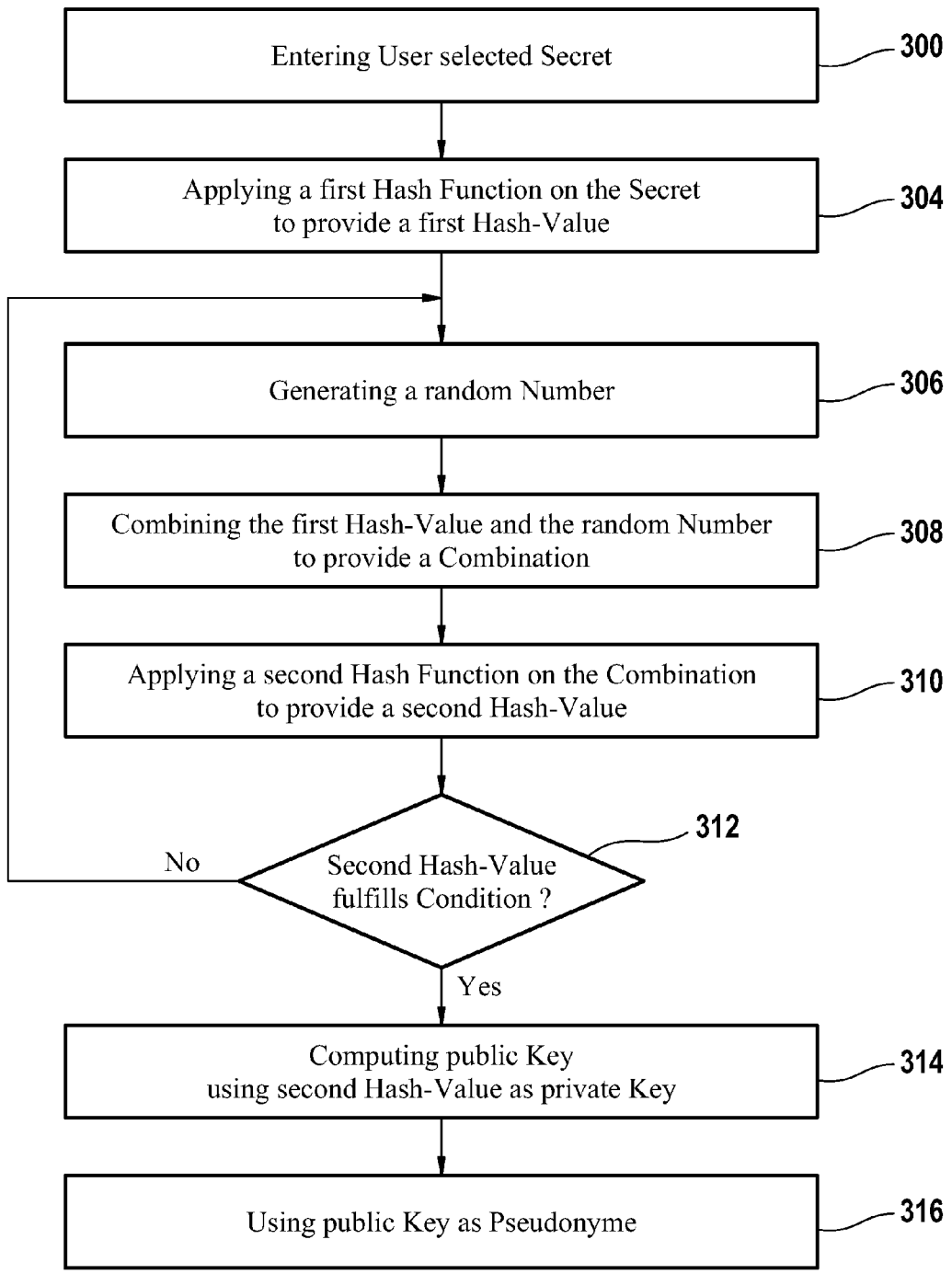
FIG. 4 is a flowchart being illustrative of a further embodiment of a method of the invention.

In still another embodiment the embedding and randomizing function 126 is implemented by two different hash functions and a random number generator (cf. the embodiment of FIGS. 3 and 4).

The key generator 128 serves to compute public key 118 using elliptic curve cryptography (ECC). The base point given by the domain parameters of the elliptic curve is multiplied by the private key 116 which provides the public key 118. By varying the base point and leaving the other domain parameters of the elliptic curve unchanged multiple pseudonyms can be computed for the user $T_i$ on the basis of the same secret $s_T$.

The computer system 100 may have a network interface 136 for coupling the computer system 100 to a database 138 via a communication network 140, such as the Internet. The database access function 130 enables to perform a write and a read access for accessing the data object 120 stored in the database 138 using the public key 118, i.e. the user's pseudonym, as a database access key, e.g. a primary key or candidate key value that uniquely identifies tuples in a database relation.

Further, an analytic system 140, such as a decision support system (DSS) can be coupled to the database 138 such as via the network 140. The analytic system 144 comprises a component 146 for analyzing the data objects of the users T which are stored in the database 138, such as by data mining or data clustering.

In one application the data objects stored in the database 138 contain medical data of the various users. By analyzing the various data objects using techniques such as data mining and/or data clustering techniques medical knowledge can be obtained. For example, data clustering may reveal that certain user attributes contained in the medical data increase the risk for certain diseases.

For generating a pseudonym $p_{T,i}$ for a user $T_i$ based on the secret $s_T$ 112 and domain parameters $D_i$ containing a base point for the elliptic curve cryptography the following steps are executed by the computer system 100 in operation:

The user $T_i$ enters his or her user-selected secret $s_T$ 112 such as via the keyboard 104. In addition, the user may enter at least one public parameter $V_{T,i}$ such as his name or email address via the keyboard 104 or otherwise. Such a public parameter $V_{T,i}$ may also be permanently stored in the computer system 100.

The secret $s_T$ 112 is temporarily stored in the memory 108. Upon entry of the secret $s_T$ 112 the embedding function 132 or the embedding component of the embedding and randomizing function 126 generates the combination 114 of the secret $s_T$ 112 and the public parameter $V_{T,i}$. The resultant combination 114 is temporarily stored in the memory 108.

Next, the randomizing function 134 or the randomizing component of the embedding and randomizing function 126 is invoked in order to calculate the private key 116 on the basis of the combination 114. The resultant private key 116 is temporarily stored in memory 108. In the next step, the key generator 128 is started for computing the public key 118 by multiplying the base point contained in the domain parameters $D_i$ of the elliptic curve being used by the private key 116.

The public key 118, i.e. the pseudonym $p_{T,i}$, is stored in memory 108. The secret $s_T$ 112, the combination 114 as well as the private key 116 as well as any intermediate result obtained by execution of the embedding and randomizing function 126 and the key generator 128 are then erased from the memory 108 and/or the processor 110. As a consequence, there is no technical means to reconstruct the assignment of the resultant pseudonym to the user $T_i$ as only the user knows the secret $s_T$ 112 that has led to the generation of his or her pseudonym $p_{T,i}$. A data object 120 containing sensitive data of the user $T_i$, such as medical data, can then be stored by execution of the database access function 130 in the pseudonym database 138 using the pseudonym $p_{T,i}$ as a database access key, e.g. a primary key or candidate key value that uniquely identifies tuples in a database relation.

The user-selected secret $s_T$ 112 may be obtained by combining a user-selected password or secret key with biometric data of the user $T_i$ that is captured by the sensor 106. For example, a hash value of the user-selected password or secret key is calculated by execution of respective program instructions by the processor 110. In this instance the hash value provides the user-selected secret $s_T$ 112 on which the following calculations are based.

A plurality of users from the public set of enrolled participants T may use the computer system 100 to generate respective pseudonyms $p_{T,i}$ and to store data objects containing sensitive data, such as medical information in the database 138 as it has been described above in detail for one of the users $T_i$ by way of example.

For reading the data object of one of the users $T_i$ from the database 138 the user has to enter the secret $s_T$ 112. Alternatively, the user has to enter the user-selected password or secret key via the keyboard 104 and an acquisition of the biometric data is performed using the sensor for computation of a hash value that constitutes $s_T$ 112. As a further alternative, the secret key is read by the computer system from an integrated circuit chip card of the user. On the basis of $s_T$ 112 the pseudonym can be computed by the computer system 100.

The pseudonym is then used for performing a database read access on the database 138 in order to read one or more data objects 120 that are stored in the database 138 for that user $T_i$. After the database access operation has been performed the secret $s_T$ 112, the combination 114, the private key 116 and the public key 118 are erased from the computer system 100 as well as any intermediate computational results.

Figure 2:
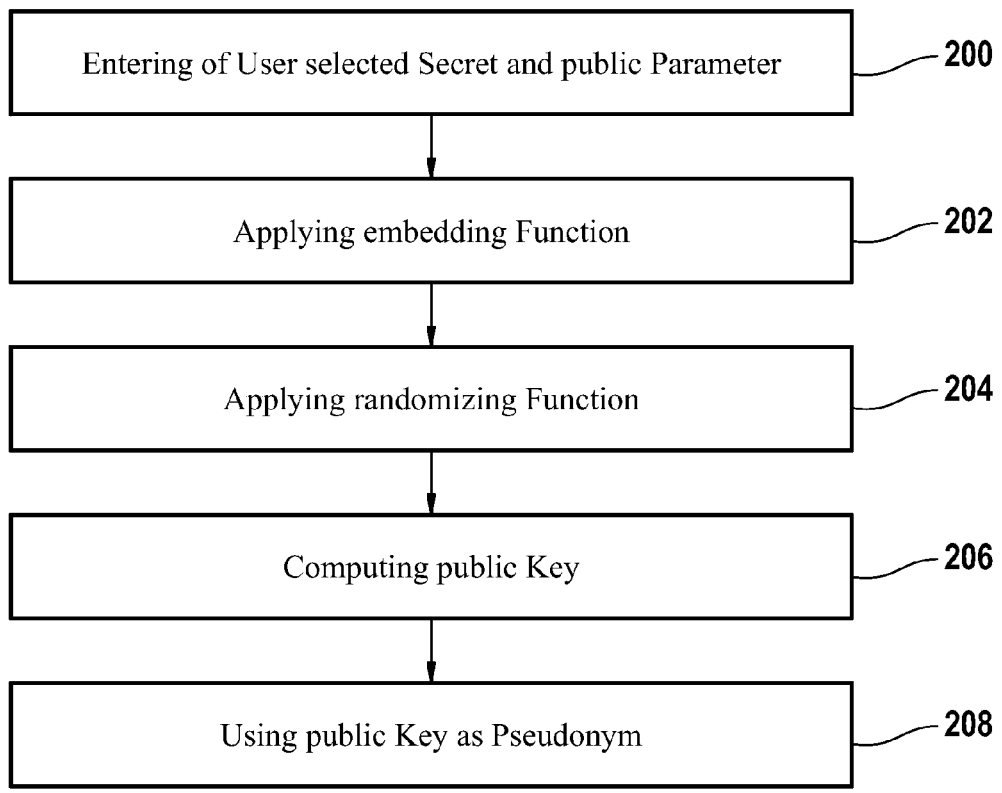
FIG. 2 is a flowchart being illustrative of an embodiment of a method of the invention.

FIG. 2 shows a corresponding flowchart. In step 200 the user $T_i$ enters his or her user-selected secret $s_T$ and public parameter $V_{T,i}$. In step 202 $s_T$ and $V_T,i$ are combined to provide the first combination by the embedding function (cf. embedding function 132 of FIG. 1). Next, the randomizing function (cf. randomizing function 134 of FIG. 1). is applied on $s_T$ and $V_{T,i}$ in step 204 which provides a private key. As an alternative, an embedding and randomizing function is applied on $s_T$ and $V_{T,i}$ which provides the private key.

In step 206 a public key is computed using the private key obtained in step 204 and the public key is used in step 208 as a pseudonym of the user $T_i$. For example the pseudonym may be used as a database access key, e.g. a primary key or candidate key value that uniquely identifies tuples in a database relation for storing a data object for the user $T_i$ in a database with pseudonymous data (cf. database 138 of FIG. 1).

FIG. 3 shows a further embodiment of computer system 100. In the embodiment considered here the embedding and randomizing function 126 comprises an embedding function 132, a random number generator 148, a first hash function 150 and a second hash function 152. In the embodiment considered here the computation of the private key 116 based on $s_T$ 112 may be performed as follows:

The first hash function 150 is applied on the user-selected secret $s_T$ 112. This provides a first hash value. Next, a random number is provided by the random number generator 148. The random number and the first hash value are combined by the embedding function 132 to provide the combination, i.e. the embedded secret $s_T$ 112.

The combination of the first hash value and the random number can be obtained by concatenating the first hash value and the random number or by performing a bitwise XOR operation on the first hash value and the random number by the embedding function 132. The result is a combination on which the second hash function 152 is applied to provide a second hash value. The second hash value is the private key 116 on which the calculation of the public key 118 is based.

Dependent on the implementation it may be necessary to determine whether the second hash value fulfils one or more predefined conditions. Only if such conditions are fulfilled by the second hash value it is possible to use the second hash value as the private key 116 for the following computations. If the second hash value does not fulfill one or more of the predefined conditions a new random number is provided by the random number generator 148 on the basis of which a new second hash value is computed which is again checked against the one or more predefined conditions (cf. the embodiment of FIG. 4).

The random number on the basis of which the private key 116 and thereafter the public key 118 has been computed is stored in a database 154 that is coupled to the computer system 100 via the network 140. The random number may be stored in the database 154 using the public parameter $V_{T,i}$ as the database access key for retrieving the random number for reconstructing the pseudonym at a later point of time.

The user $T_i$ may use the pseudonym provided by the computer system 100 for his or her registration in an anonymous online community 156 e.g. a social network. For registration the user $T_i$ creates his or her user profile 158 by entering the pseudonym 118 as the username such that the various private data entered into the user profile 158 remain private even though they are published in the online community 156 due to the fact that the assignment of the pseudonym to the user $T_i$ is stored nowhere and cannot be reconstructed by technical means without knowledge of the user-selected secret $s_T$ 112.

For reconstructing the pseudonym the user has to enter his or her user-selected secret $s_T$ 112 into the computer system on the basis of which the first hash value is generated by the hash function 150 and the combination 114 is generated by the embedding function 132 or the embedding component of the embedding and randomizing function 126 using the first hash value and the random number retrieved from the database 154.

Depending on the implementation, the user may also need to enter the user's public parameter $V_{T,i}$. A database access is performed using the user's public parameter $V_T,i$ as a database access key, e.g. a primary key or candidate key value that uniquely identifies tuples in a database relation, in order to retrieve the random number stored in the database 154.

In other words, the reconstruction of the private key 116 is performed by applying the embedding function 132 on the first hash value obtained from the user-selected secret $s_T$ 112 and the retrieved random number which yields the combination 114. The first hash value is combined with the random number retrieved from the database 154 by the embedding function 132 to provide the combination onto which the second hash function 152 is applied which returns the private key 116, out of which the public key 118, i.e. the pseudonym, can be computed. After the user $T_i$ has recovered his or her pseudonym a database access for reading and/or writing from or to the database 138 may be performed or the user may log into the online community 156 using his or her pseudonym for anonymous participation in the online community 156.

FIG. 4 shows a respective flowchart for generating a pseudonym $p_{T,i}$ for user $T_i$. In step 300 the user enters the user-selected secret $s_T$. In step 304 a first hash function is applied on the user-selected secret $s_T$ which provides a first hash value. In step 306 a random number is generated and in step 308 an embedding function is applied on the first hash value and the random number to provide a combination of the first hash value and the random number. In other words, the first hash value and the random number are mapped to a 1-dimensional space, e.g. a single number, by the embedding function. The combination can be obtained by concatenating the random number and the first hash value or by performing a bitwise XOR operation on the first hash value and the random number.

In step 310 a second hash function is applied on the combination which provides a second hash value. The second hash value is a candidate for the private key. Depending on the implementation the second hash value may only be usable as a private key if it fulfils one or more predefined conditions. For example, if ECC is used, it is checked whether the second hash value is within the interval between 2 and n−1, where n is the order of the elliptic curve.

Fulfillment of such predefined conditions is checked in step 312. If the condition is not fulfilled, the control returns to step 306. If the condition is fulfilled, then the second hash value qualifies to be used as a private key in step 314 to compute a respective public key providing an asymmetric cryptographic key-pair consisting of the private key and the public key. In step 316 the public key computed in step 314 is used as a pseudonym such as for accessing a pseudomized database, participation in an anonymous online community or other purposes.

FIG. 5 shows a flow chart which illustrates a method according to an embodiment of the invention. The method may be, as an example, implemented as a computer implemented method or instructions for a processor which are stored on a computer readable storage medium. In step 500 an input value is accessed. In step 502 a pseudonym is calculated by applying a cryptographic one-way function to the input value.

FIG. 6 shows a flow chart which illustrates a further embodiment of a method according to an embodiment of the invention. In step 600 an input value is accessed. In step 602 a first public key is calculated using the input value and a first base point. Elliptic curve cryptography is used to calculate the first public key. The input value in this embodiment is a private key suitable for use with elliptic curve cryptography. In step 604 the first public key is output as a pseudonym. In step 606 a second public key is calculated using the input value and a second base point. As with the calculation of the first public key the calculation of the second public key is performed using elliptic curve cryptography. In step 608 the second public key is output as a public key for the use of the encryption of data.

Figure 7:
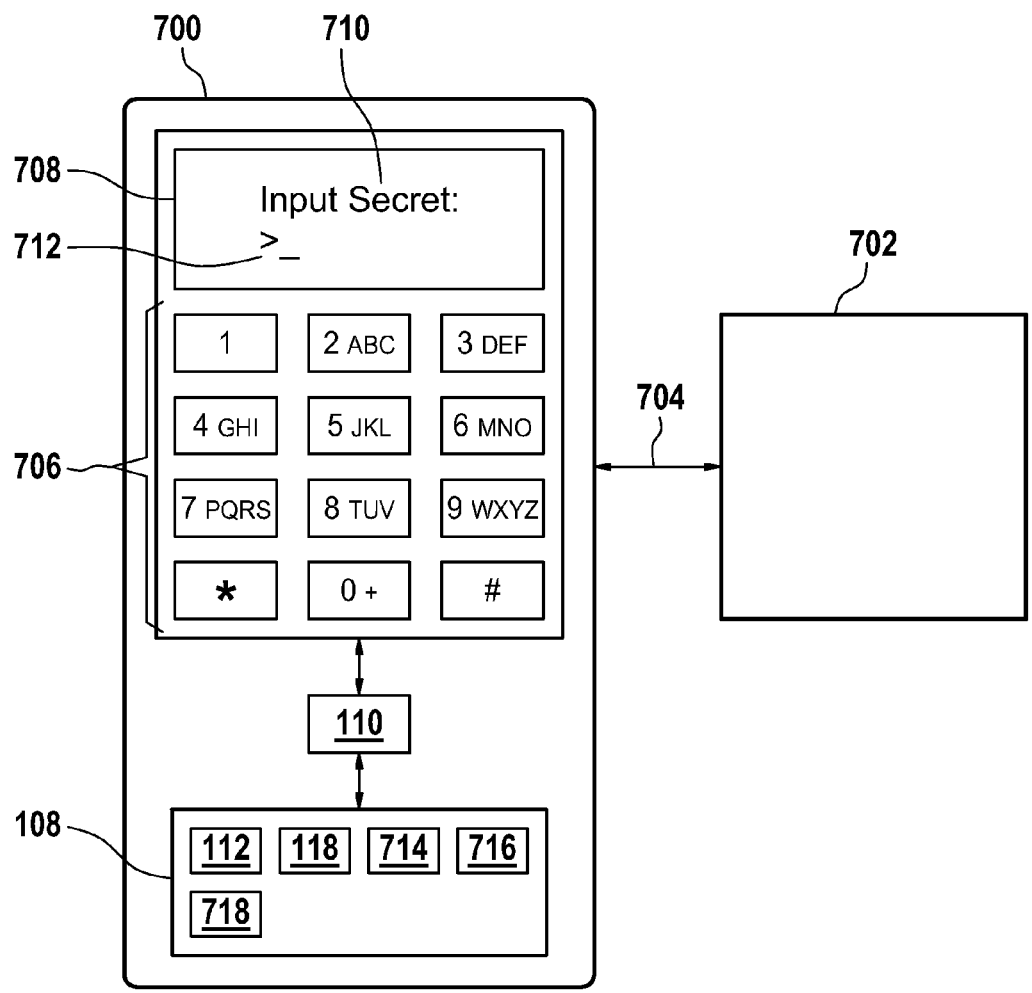
FIG. 7 is a block diagram of an embodiment of the invention of a computing device implemented as a cellular telephone.

FIG. 7 shows a functional diagram of a cell phone 700 according to an embodiment of the invention. The cell phone 700 is shown as being connected to a computer 702 via a communication link 704. The cell phone 700 may transfer a pseudonym 118 to the computer 702 via the communication link 704. In this embodiment the cell phone 700 could also be other types of mobile computing devices. These include for example, but are not limited to: a personal digital assistant, an mp3 player, and a laptop. The communications link 704 may be a variety of different types of communication link. It may be a wireless cell phone connection, it may be a Bluetooth connection, or it may be a wireless land connection, or it may be a LAN connection.

The cell phone 700 is shown as comprising a processor 110. The processor 110 is connected to a user interface 102 and a memory 108. The user interface 102 in this embodiment is shown as comprising a set of input keys 706 and a display 708. However, it is understood that the input 706 and the display 708 may be combined into a single functional unit. For instance many cellular telephones, personal digital assistants, and mp3 players use touch sensitive screens. Instead of using input keys 706 gestures or symbols on a touch sensitive screen may also be used. The display 708 shows a message 710 prompting a user to input a user-selected secret 112. The display 708 also shows a cursor 712 which shows a user where the value is input. The processor 110 is also connected to a memory 108. Within the memory is shown the stored user-selected secret 112. The user-selected secret 112 may be used to generate the input value. In some embodiments the user-selected secret 112 may be identical with the input value 714. In other embodiments the user-selected secret 112 may be used to generate the input value 714. An input value generator 716 may be used to generate an input value 714 from a user-selected secret 112. The input value 714 may be equivalent to the private key 716 as was discussed in the embodiments of FIGS. 1 and 3. The memory 108 may also contain a cryptographic module 718 which uses the input value 714 to generate a pseudonym 118.

The memory 108 shown in FIGS. 1 and 3 may be equivalent to the memory 108 shown in FIG. 7. The data shown within the RAM 108 shown in FIGS. 1 and 3 may also be stored within the RAM or memory 108 of FIG. 7. The processor 110 shown in FIG. 7 may also be equivalent to the processors shown in FIGS. 1 and 3. That is to say that the processor 110 and the memory 108 of FIG. 7 may also be used to implement the embodiments shown in FIGS. 1 and 3. The memory 108 shown in FIGS. 1, 3, and 7 are embodiments of a computer readable storage medium.

Figure 8:
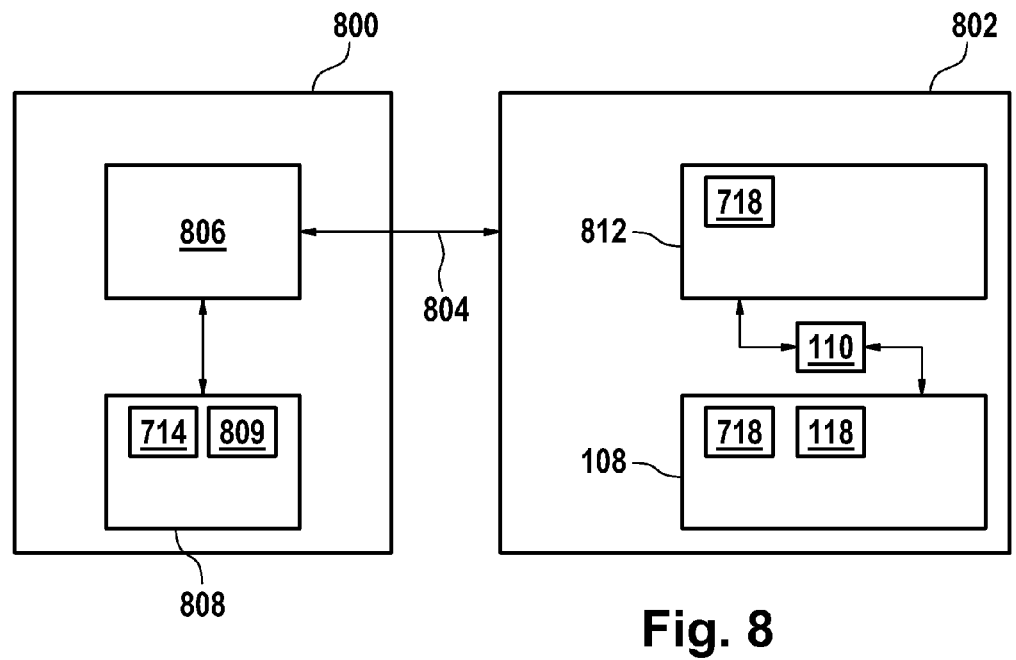
FIG. 8 is a block diagram of a further embodiment of the invention of a computing device implemented as a security token.

FIG. 8 shows an embodiment of a computing device comprising a security token 800 and a computer 802. The security token 800 is connected to the computer 802 via a communications link 804. The communications link varies depending upon the implementation of the security token 800. For instance the security token may be an RFID tag in which case the communications link 804 is a radio frequency communications link. Alternatively, the security token 800 may also be something as simple as a USB thumb drive. In this case the communications link 804 is a USB bus. The security token 800 is shown as comprising a microcontroller 806 and a memory 808. Memory 808 is shown as containing the input value 714 and an access control module 809. The access control module 809 is optional, but the access control module 809 contains instructions for operation of the microcontroller 806 which control access to the input value 714.

The security token 800 may be constructed such that the input value 714 is stored in secure memory or memory which may be destroyed if the security token 800 is disassembled. The computer 802 comprises a processor 110 and computer memory 108. The computer 802 also comprises computer storage 812. During operation the processor 110 may access via the communications link 804 the input value 714 stored in memory 808. The processor 110 may then use a cryptographic module 718 to generate the pseudonym 118.

The cryptographic module 718 is also shown as being stored in the computer storage 812. Both the computer memory 108 and the computer storage 812 are examples of computer readable storage medium. The embodiments of FIGS. 1 and 3 may be implemented using the security token 800 and computer 802 of FIG. 8. For instance the processors 110 of FIGS. 1 and 3 may correspond to the processor 110 of FIG. 8. The memory 108 of FIGS. 1 and 3 may also correspond to the memory 108 of FIG. 8. The data and instructions shown as being stored in the memory 108 or the processor 110 may also be stored in the processor 110 or memory 108 of FIG. 8 respectively.

Figure 9:
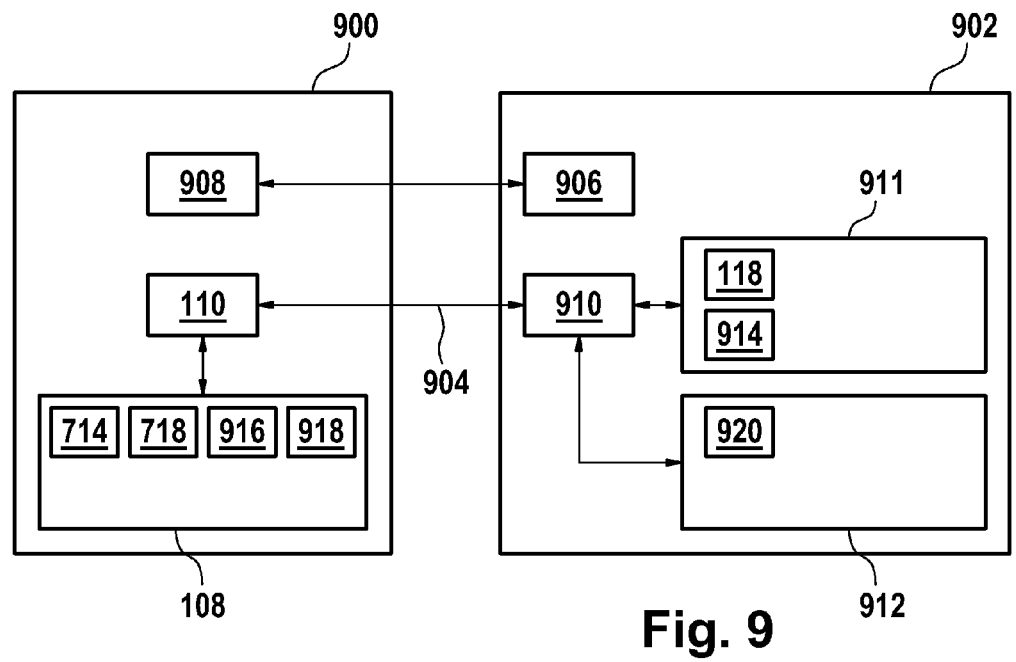
FIG. 9 is a block diagram of a further embodiment of the invention of a computing device implemented as a smart card.

FIG. 9 shows an embodiment of a smart card 900 according to an embodiment of the invention. The smart card 900 is shown as being connected to a computer 902 via a communications link 904. The nature of the communications link 904 depends upon how the smart card 900 is implemented. For instance if the smart card 900 connects to the computer 902 via contacts or electrical connections then the communications link 904 is simply a computer bus. However, if the smart card 900 uses an RFID communications link then the communications link 904 to the computer 902 is via radio.

The smart card 900 in this embodiment is shown as being powered by the computer 902. The computer 902 comprises an electrical power source 906 which is connected to an electrical power receiver 908. In the case of electrical contacts then this is simply an electrical connection between the two of them. For an RFID smart card the connection between the electrical power source 906 and the electrical power receiver 908 is through electrical induction. The electrical power receiver 908 powers the smart card 900. The smart card 900 is shown as comprising a processor 110. The processor 110 is connected to a computer memory 108. The computer memory 108 contains the input value 714 in a secure memory location. There is a cryptographic module 718 which may be used to generate the public key 118 or pseudonym. The processor 110 is connected to a processor 910 of the computer system 902. The computer system 902 is shown as comprising computer memory 911 and computer storage 912.

During operation the processor 910 may request a pseudonym 118 from the processor 110 of the smart card 900. The computer system 902 may comprise a smart card access module 920 which comprises instructions or commands which allow basic access to the smart card 900. When access is granted the processors 110 will use the input value 714 and the cryptographic module 718 to calculate the pseudonym 118. In this embodiment, elliptic curve cryptography is used by the cryptographic module 718. The cryptographic module 718 uses a first base point 916 to calculate the pseudonym. The processor 910 may also request a public encryption key 914 to be generated by the smart card 900. In this case the processor 110 uses the second base point 918 which is stored with the memory 108 and the cryptographic module 718 to generate the public encryption key 914 which is output to the processor 910. In this example the pseudonym 118 and the public encryption key 914 are both shown as being stored in computer memory 911.

The embodiments of FIGS. 1 and 3 may be implemented using the smart card 900 of FIG. 9. For instance the processors 110 of FIGS. 1 and 3 may correspond to the processor 110 of FIG. 9. The memory 108 of FIGS. 1 and 3 may also correspond to the memory 108 of FIG. 9. The data and instructions shown as being stored in the memory 108 or the processor 110 of FIGS. 1 and/or 3 may also be stored in the processor 110 or memory 108 of FIG. 8.

Mathematical Appendix

1. Embedding Functions.

There exist n-ary scalar functions $$\alpha^r: N \times \ldots \times N \to N^d$$

which are injective—and even bijective, where N is the set of natural numbers. The function d( ) embeds uniquely an n-dimensional space, i.e. n-tuples $(k_1, \ldots, k_n)$, into scalars, i.e. natural numbers k.

2. The Binary Cantor Pairing Function

The binary cantor pairing function $\pi$ is an embodiment of embedding function 132. The binary cantor pairing function is defined as follows:

$$\pi: \mathbb{N} \times \mathbb{N} \to \mathbb{N}$$

$$\pi(m, n) = \frac{1}{2}(m+n)(m+n+1) + n$$

which assigns to each fraction m/n the unique natural number $\pi(m, n)$—thus demonstrating that there are no more fractions than integers. Hence, if we map both $s_T$ and $V_{T,i}$ to natural numbers and use the fact that all identities are distinct then $\pi(s_T, V_{T,i})$ yields a unique value for each identity, even if there are equal personal secrets. To be more precise, since this function does not distinguish between e.g. ½, ²⁄₄ etc, it assigns to each fraction an infinite number of unique natural numbers.

3. Elliptic Curve Cryptography (ECC)

Let:
p be a prime number, p>3, and $\mathbb{F}_p$ the corresponding finite field
a and b integers
Then the set E of points (x, y) such that $$E = \{(x,y) \in \mathbb{F}_p \times \mathbb{F}_p | y^2 = x^3 + ax + b\} \qquad (F1)$$

defines an elliptic curve in $\mathbb{F}_p$. (For reasons of simplicity, we skip the details on E being non-singular and, as well, we do not consider the formulae of elliptic curves over finite fields with p=2 and p=3. The subsequent statements apply to these curves, too.) The number m of points on E is its order.

Let P,Q∈E be two points on E. Then the addition of points $$P+Q=R \text{ and } R \in E \qquad (F2)$$

can be defined in such a way that E forms an Abelian group, viz, it satisfies the rules of ordinary addition of integers. By writing $$P+P=[2]P$$

We define the k-times addition of P as [k]P, the point multiplication.

Now EC-DLP, the elliptic curve discretionary logarithm problem, states that if $$Q=[k]P \qquad (F3)$$

then with suitably chosen a, b, p and P, which are known to the public, and the as well known to the public point Q it is computationally infeasible to determine the integer k.

The order n of a point P is the order of the subgroup generated by P, i.e. the number of elements in the set $$\{P,[2]P,\ldots,[n]P\} \qquad (F4)$$

With all this in mind we define an elliptic curve cryptographic (ECC) system as follows. Let:
E be an elliptic curve of order m
B∈E a point of E of order n, the base point
Then $$D=\{a,b,p,B,n,co(B)\} \qquad (F5)$$

with $$co(B) = \frac{m}{n}$$

defines a set of domain ECC-parameters. Let now g be an integer and $$Q=[g]B \qquad (F6)$$

Then (g, Q) is an ECC-key-pair with g being the private key and Q the public key.

For we rely on findings of Technical Guideline TR-03111, Version 1.11, issued by the Bundesamt für Sicherheit in der Informationstechnik (BSI), one of the best accredited sources for cryptographically strong elliptic curves, we can take that m=n, i.e. co(B)=1, and hence reduce (F5) to $$D=\{a,b,p,B,n\} \tag{F7}$$

Now we can define our one-way function. Let D be a set of domain parameters concordant with (F7). Then $$f: [2,n-1] \to E$$

$$k \mapsto [k]B \tag{F8}$$

i.e. the point multiplication (F6), is an injective one-way function.

4. Implementing Key Generator Based on ECC

The key generator 128 (cf. FIGS. 1 and 3) can be implemented using ECC.

Definitions:

There are public sets of ECC-domain parameters $D_1, D_2, \ldots$ concordant with (F7)

$$D_i=\{a_i,b_i,p_i,B_i,n_i\} \tag{F9}$$

There are public functions: an embedding function d( ), a randomising function r( ) and our one-way function f( ) defined by (F8).

There is a public set of enrolled participants (users)

$$T=\{T_1,T_2,\ldots\} \tag{F10}$$

Note that a $T_i$ does not necessarily possess any personally identifying details, i.e. we assume that T resembles the list of participants in an anonymous Internet-community, in which each participant can select his name at his discretion as long as it is unique.

Each participant T∈T chooses at his complete discretion his personal secret $s_T$. In particular, for this secret is never revealed to anybody else—it is the participant's responsibility to ensure this—it is not subject to any mandatory conditions, such as uniqueness.

Our pseudonym derivation function is $$h(\ )=f(r(d(\ ))) \tag{F11}$$

with the following properties:

Given a T∈T with his $s_T$, a $D_i$ and T, $D_i \in V_{T,i}$ $$r(d(s_T,V_{T,i}))=g_{T,i} \tag{F12}$$

where $g_{T,i}$ is a unique and strong, i.e. sufficiently random, private ECC-key for $D_i$.

The pseudonym corresponding to T, $s_T$ and $D_i$ is $$p_{T,i}=f(g_{T,i},D_i)=[g_{T,i}]B_i=(x_{T,i},y_{T,i}) \tag{F13}$$

There is a public set of pseudonyms $$P=\{p_1,p_2,\ldots\} \tag{F14}$$

such that P comprises one or more pseudonyms for each participant in T computed according to (F11). This wording implies that here is no recorded correspondence between a participant in T and his pseudonyms in P, i.e. each $p_{T,i}$ is inserted in an anonymous way as $p_k$ into P.

Remarks:

The use of multiple domain parameters enables us to endow a single participant with a single personal secret with multiple pseudonyms. This in turn enables a participant to be a member of multiple pseudonymous groups such that data of these groups cannot—for, e.g. personal or legal reasons—be correlated. Therefore, attempts to exploit combined pseudonymous profiles for unintended, possibly malicious purposes, are of no avail.

The distinction between two sets of domain parameters $D_i$ and $D_j$ can be minor. In accordance with our principle to use only accredited domain parameters, e.g. those listed in BSI TR-03111, we can set $$D_i=\{a,b,p,B,n\} \tag{F15}$$

by swapping B for a statistically independent $B_2$, i.e. by choosing a different base point, we can set $$D_j=\{a,b,p,B_2,n\} \tag{F16}$$

For $D_i$ and $D_j$ refer to the same elliptic curve we can have only one function (F12) and introduce the crucial distinction with (F13). This vastly simplifies concrete implementations—we select a suitable curve and vary the base points only.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. Although example diagrams to implement the elements of the disclosed subject matter have been provided, one skilled in the art, using this disclosure, could develop additional hardware and/or software to practice the disclosed subject matter and each is intended to be within the scope of the accompanying claims. In addition to the above described embodiments, those skilled in the art will appreciate that this disclosure has application in a variety of arts and situation and this disclosure is intended to include the same.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS

100 Computer system
102 User interface
104 Keyboard
106 Sensor
108 Memory
110 Processor
112 A user-selected secret
114 Combination
116 Private Key
118 Public Key
120 Data Object
122 Computer program instructions
124 Combination generator
126 Embedding and randomizing function
128 Key Generator
130 Database access function
132 Embedding function 134 Randomizing function
136 Network interface
138 Database
140 Network
144 Analytic system
146 Component
148 Random number generator
150 Hash function
152 Hash function
154 Database
156 Online community
158 User profile
700 cell phone
702 computer
704 communications link
706 input keys
708 display
710 message
712 display
714 input value
716 input value generator
718 cryptographic module
800 security token
802 computer
804 communications link
806 microcontroller
808 memory
809 access control module
812 computer storage
900 smart card
902 computer
904 communications link
906 electrical power source
908 electrical power receiver
910 processor
911 computer memory
912 computer storage
914 public encryption key
916 first base point
918 second base point
920 smartcard access module

The invention claimed is:

1. A non-transitory computer readable storage medium having stored therein a program for a method of generating a pseudonym, the method comprising the steps of:
accessing an input value;
calculating a first public key using elliptic curve cryptography, said input value, and a first base point, wherein said input value and said first public key are an asymmetric cryptographic key pair;
outputting said first public key as a pseudonym;
calculating a second public key using elliptic curve cryptography, said input value, and a second base point, wherein said second base point is different than said first base point; and
outputting said second public key as a public key for the encryption of data.

2. The computer readable storage medium of claim 1, wherein said input value is a private key which can be used for calculating at least one public key to form at least one asymmetric cryptographic key pair.

3. The computer readable storage medium of claim 2, wherein said at least one asymmetric cryptographic key pair is calculated using elliptic curve cryptography.

4. The computer readable storage medium of claim 1, wherein the method further comprises the steps of:
receiving a user-selected secret and storing said user-selected secret in a memory;
computing a private key by applying an embedding and randomizing function onto said user-selected secret;
storing said private key in said memory, wherein said private key is said input value;
erasing said user-selected secret and said private key from said memory.

5. The computer readable storage medium of claim 4, wherein said embedding and randomizing function comprises a binary Cantor pairing function for embedding said user-selected secret.

6. The computer readable storage medium of claim 4, said embedding and randomizing function comprising encrypting at least an embedded secret using a symmetric cryptographic algorithm by means of a symmetric key for randomizing said embedded secret.

7. The computer readable storage medium of claim 4 said embedding and randomizing function comprising encrypting at least said user-selected secret using AES by means of a user-specific symmetric key for embedding and randomizing said user-selected secret.

8. The computer readable storage medium of claim 4, wherein said embedding and randomizing function comprises:
applying a first one-way function on said user-selected secret to provide a first value;
providing a random number;
embedding said random number and said first value by combining them to provide a combination; and
applying a second one-way function on said combination to provide a second value, wherein said second value constitutes said private key.

9. The computer readable storage medium of claim 8, further comprising providing a set of domain parameters comprising a first base point for the ECC cryptography, computing said public key for providing said pseudonym by the ECC cryptography using said domain parameters and said first base point, replacing said first base point by a second base point in said domain parameters, and computing a second public key by ECC cryptography using said second base point to provide a second pseudonym.

10. A computer implemented method of generating a pseudonym, the method comprising the steps of:
accessing an input value; and
calculating a first public key using elliptic curve cryptography, said input value, and a first base point, wherein said input value and said first public key are an asymmetric cryptographic key pair;
outputting said first public key as a pseudonym;
calculating a second public key using elliptic curve cryptography, said input value, and a second base point, wherein said second base point is different than said first base point; and
outputting said second public key as a public key for the encryption of data.

11. A computing device comprising a processor and a memory, wherein the memory contains instructions for performing a method of generating a pseudonym, the method comprising the steps of:
accessing an input value; and
calculating a first public key using elliptic curve cryptography, said input value, and a first base point, wherein said input value and said first public key are an asymmetric cryptographic key pair;

outputting said first public key as a pseudonym;

calculating a second public key using elliptic curve cryptography, said input value, and a second base point, wherein said second base point is different than said first base point; and outputting said second public key as a public key for the encryption of data.

12. The computing device of claim 11, wherein the computing device is one of: a cellular telephone, a smart card, a security token, a personal digital assistant, an RFID tag and RFID card, a computer, and a computer system.

13. The computing device of claim 11, wherein said input value is a private key.

14. The computing device of claim 11 wherein the computing device includes memory, wherein said input value is stored within said memory.

15. The computing device of claim 11 wherein a user-selected secret is received from a user interface; and wherein said input value is derived from said user-selected secret.

16. The computing device of claim 11, wherein the computing device comprises:

a user interface for entering a user-selected secret;

a memory for storing said user-selected secret and a private key;

a processor operable for executing instructions stored in said memory, wherein said memory contains instructions for performing the steps of:

receiving said user-selected secret and storing said user-selected secret in a memory;

computing a private key by applying an embedding and randomizing function onto said user-selected secret;

storing said private key in said memory, wherein said private key is said input value;

erasing said user-selected secret and said private key from said memory.

* * * * *